United States Patent [19]
Mango

[11] 3,827,736
[45] Aug. 6, 1974

[54] HEATED, VIBRATORY TRACK SANDER
[76] Inventor: Silvio D. Mango, 55 Carleton Ter., Cresskill, N.J. 07626
[22] Filed: Jan. 11, 1973
[21] Appl. No.: 322,605

[52] U.S. Cl............ 291/20, 291/23, 291/25, 291/28, 291/32, 291/38
[51] Int. Cl.... B60b 39/06, B60b 39/10, B61c 15/10
[58] Field of Search............ 291/19, 20, 25, 26, 28, 291/32, 38

[56] References Cited
UNITED STATES PATENTS

| 546,581 | 9/1895 | Davis | 291/20 |
|---|---|---|---|
| 563,237 | 6/1896 | Porter | 291/20 |
| 1,338,640 | 4/1920 | Littell | 291/32 X |
| 1,832,581 | 11/1931 | Riley | 291/3 |
| 1,877,475 | 9/1932 | Cowan | 291/19 |
| 1,955,307 | 4/1934 | Morrison et al. | 291/23 X |
| 2,484,985 | 10/1949 | Doud et al. | 291/25 X |
| 2,677,563 | 5/1954 | Weiner | 291/3 |
| 2,712,954 | 7/1955 | Huber | 291/2 |
| 2,720,407 | 10/1955 | Mermelstein | 291/25 |
| 3,034,816 | 5/1962 | Thompson | 291/23 X |
| 3,298,727 | 1/1967 | Picard | 291/20 X |

Primary Examiner—M. Henson Wood, Jr.
Assistant Examiner—Howard Beltran

[57] ABSTRACT

This invention in a preferred embodiment is directed to a truck or automobile having associated with at least one or more rear wheels, and preferably with also front wheels separate vessels, one for each wheel, actuateable by either brake or special actuation switch means or both to release vessel sand and/or salt contents through a directed outlet opening in front of the respective tires, and also behind the rear tires, the mechanism being separate for each of the front-of-tires release and the behind-tires release as controlled by the gear shift lever such that the anti-skid composition or mixture will be released on the track or path behind the tires only when backing and otherwise only in front of the tires when the vehicle is geared for forward motion, each vessel including a heating means for maintaining temperatures thereof and the contents thereof in an above-freezing state and a vibrator associated with each vessel for facilitating gravity feed of solid contents of the vessel down an inclined wall and out of the outlet of the vessel, the vessel being mounted on rubber mounting structure itself mountable onto the vehicle, the period of actuation and feed being for typically one cycle of a one-cycle motor connected for revolving a feed gate at each vessel outlet opening for thereby feeding a controlled amount per actuation by virtue of a coil induction switch remaining closed for continuing a closed circuit until the one motor-cycle is completed, there being a master switch for activating and deactivating the entire system's electrical circuitry.

7 Claims, 7 Drawing Figures

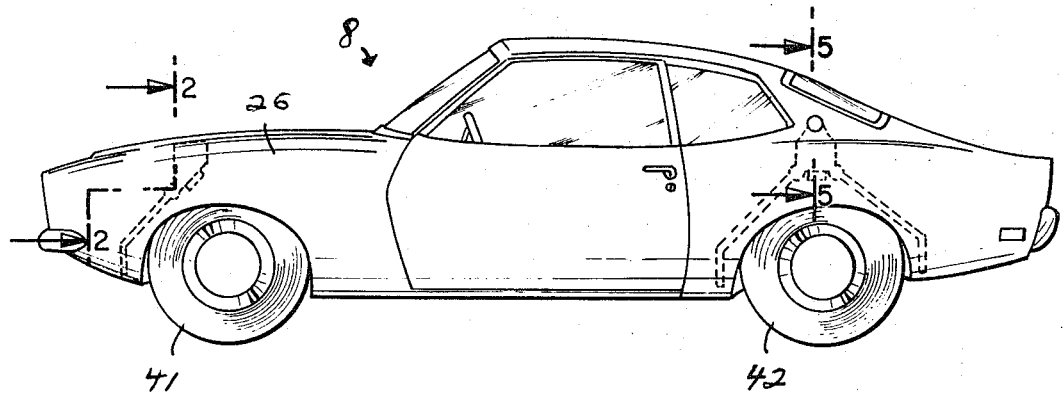
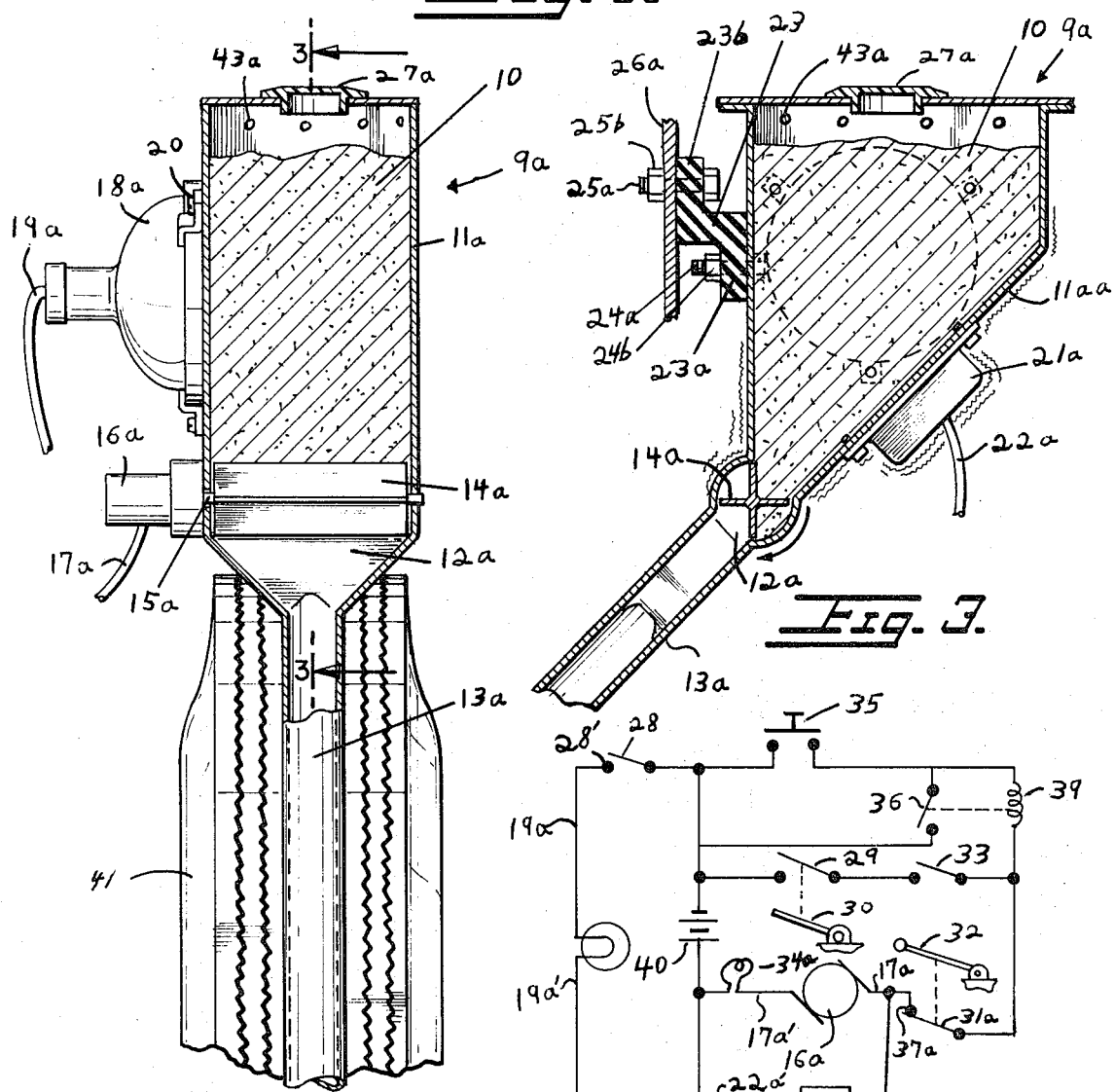

HEATED, VIBRATORY TRACK SANDER

THE SPECIFICATION

This invention relates to an anti-skid device for use on automobiles and trucks to prevent slipping or skidding on ice or other slippery surfaces.

BACKGROUND TO THE INVENTION

Typical of prior art devices is U.S. Pat. No. 1,955,307 which has a square bottomed container vessel, a mere open-close valve movable of a barrier across an open linear channel thereafter having a bend therein and the valve being lever operated by action on the lever by either of a brake arm or an electrically actuated selenoid arm, the barrier being moved by rotary reciprical to and fro motion upon opening and thereafter closing the valve. Another such patent is U.S. Pat. No. 3,034,816 in which both a button and a brake arm each close their respective switch in a common electrical circuit for actuation of a piston for pulling a slide valve, the sliding motion of the valve serving to reverse current flow by tripping a throw switch whereby the selenoid reverses the direction of slide of the valve to close the valve channel, together with a vibrator located on an upper edge of the vessel, and the feed conduit including a bend therein. The prior U.S. Pat. No. 2,677,563 has a central sand hopper with long and branching pipes leading to a plurality of different feeder openings and directs exhaust fumes into the pipes for the heating thereof, with the pipes extending in diverse directions all about horizontal until the point of discharge opening. Prior U.S. Pat. No. 2,484,985 similarly discloses a square-bottomed vessel with a lateral outlet requireing lateral flow of the sand upon lateral withdrawal of the blocking closure means. U.S. Pat. No. 1,832,581 like U.S. Pat. No. 2,677,563, has a central reservoir with a feed pipe branched severally and about horizontally, with the exhaust pipe being fed into and through the reservoir and pipes of sand feed to facilitate feed. The U.S. Pat. No. 2,712,954 discloses a pneumatic system having separate switches for each of the front units and rear units, with square-bottomed vessels. All feed in front of the wheel only.

Each and all of the above-noted prior systems include difficulties and disadvantages which detract from practical commercial feasibility of such systems in motorvehicles, such as square bottomed vessels not readily feeding a solid therethrough, and feed sand tending to compact at the opening and not feeding through the open-valved outlet opening and/or not feeding around a bend in a pipe nor being readily feedable along substantially horizontal pipes nor evenly (if at all) through branched pipes, particularly where feed pipe transport long distances from a feed vessel or reservoir, particularly where lateral feed of a solid is necessary. Exhaust fumes and gases through sand, directed from the motor would serve to stain-out high quantities of moisture into the sand thereby making the sand soggy, compact and non-feedable, as well as the heat of manifold gases requireing safety insulation of the pipes against overheating of inflamable enviromental structures. Both exhaust gases and other pneumatic gases tend to channel through the sand rather than carry the sand along, as well as pneumatic equipment being a costly accessory. Where a vibrator is utilized, little is accomplished if the vibrated surface is a non-feeding surface, as well as serving to cause distracting and unpleasant vibrations in the motorvehicle.

SUMMARY OF THE INVENTION

The present invention is directed to objects which overcome one or more of the above-noted difficulties as well as having additional desirable objects.

In particular, an additional object is to obtain a feeder which economically and efficiently avoids sand-moisture freeze-up which could cause hazardous sand-flow delays.

Another object is to obtain an effectively mounted vibrator facilitating feed flow, together with a properly shaped feed vessel for achieving optimum feed and flow of feed solids.

Another object is to obtain an optimum measured-quantity feed of feed solids per actuation.

Another object is to obtain a system preventable of slip and/or skid on slippery surfaces for both forward and rearward vehicular motion, selectively.

Another object is to obtain a cushioning mount as a part of the vessel to avoid vehicle vibrations from the mounted structure.

Another object is to obtain a prolonged-cycle circuit feedable after and subsequent to initial actuation of a feed electrical circuit.

Another object is to obtain indicator means indicative of present operation or non-operation of the feed circuit.

Other objects become apparent from the above and following disclosure.

One or more objects of the present invention are obtained by the invention as described herein.

Broadly the invention includes a reservoir vessel structure having at least one inclined-wall as a feed wall along the top of which is feedable slidably solid contents within the vessel directly to a feed outlet opening and valve structure, with a downwardly feed conduit channelable of valve-fed contents directly over a short downward and laterally angularly inclined distance to a point of feed to a position forward of or rearward of a vehicle tire relative to the vehicle front and back. In various preferred embodiments, there is a vibrator mounted directly onto the inclined-wall, a heating element for dry-heating vessel parts and contents which otherwise might freeze-up to delay or totally prevent feed of the contents, and a substantially rigid resilient mounting for the vessel structure for mounting it onto the motor vehicle thereby avoiding rattling and vibrations, particularly where a vibrator is utilized to facilitate sand movement along the inclined-wall, and there being preferably a gear-shift (manual gear or automatic) shift-lever directly connected to the electrical switches controlling activation and deactivation of the respective forward-of-tire outlet valve(s) and rearward-of-tire outlet valve(s) as dependent upon whether the gear-shift lever is in forward position or reverse position, and preferably a measured-feed rotary feed valve, and preferably a continued-actuation-period induction-relay switch in combination with a typically one-cycle motor which breaks contact at the end of each complete cycle whereby the broken cycle causes the induction relay switch to open from its induce-closed state, and there preferably being an indicator light or bell or buzzer or the like in the activated circuit. In a particular preferred embodiment of the above-noted types, it is desireable that there be a separate means for activating the opening of the flow gate other than merely by a brake, for use when the auto or truck is climbing or descending a slippery grade of road, and that the duration of feed be prolonged per actuation beyond the instant of merely pressing a button in order that full driver attention may be directed to driving on the slippery surface and also the feed terminated automatically without requiring further driver attention unless reactivation is desirable. There also is preferably a master control for cutting-out brake actuation for periods when braking is necessary but when driving surfaces are not of a slippery nature.

THE FIGURES

FIG. 1 illustrates a typical automobile embodying the present invention, showing in phantom the positions of the feed vessels and conduits of the front and rear anti-skid (and anti-slip-of-tire) devices of the present invention for the left front wheel and left rear wheel, the rear device having dual forward and aft outlets for selectively feeding contents in front of or alternately behind the tire, depending upon whether the auto is traveling or about to travel forwardly or rearwardly.

FIG. 2 illustrates a view of the forward device of FIG. 1, shown in in-part view, as taken along lines 2—2 of FIG. 1.

FIG. 3 illustrates a view as taken along lines 3—3 of FIG. 2.

FIG. 4 illustrates a typical preferred electrical circuitry for the forward device of FIGS. 1 through 3.

DETAILED DESCRIPTION OF THE INVENTION

Figure 5:
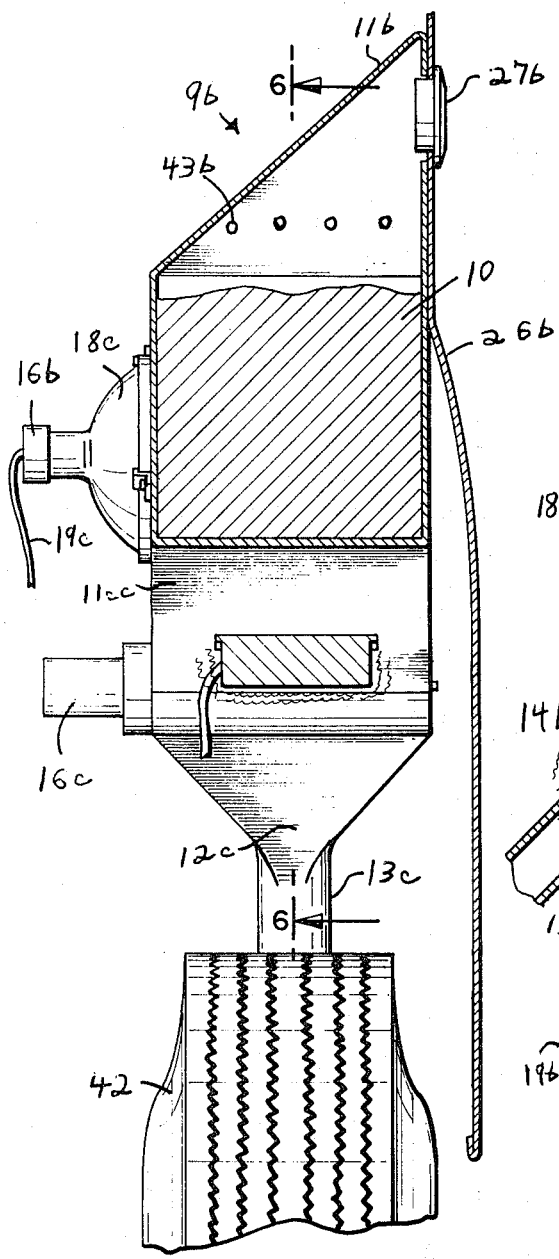
FIG. 5 illustrates an in-part view of the rear device of FIG. 1, as taken along lines 5—5 of FIGS. 1, and 6.

With reference to the above-noted Figures, FIG. 1 discloses automobile 8 having body support structure 26, including forward wheel vicinity support structure 26a and rearward wheel vicinity support structure 26b. FIGS. 2 and three illustrate a typical inventive preferred front wheel anti-skid combination 9a, including vessel structure 11a containing sand and/or other antiskid mixture and/or composition such as salt grains, or other desired chemical(s) and an outlet 12a at a base of a lower inclined-wall 11aa having rotary valve 14a mounted in the outlet 12a and the valve 14a being rotatable by rotary motor 16a by power source line 17a, with the rotary gate valve 14a mounted on rotary axis 15a, which valve 14a upon actuation of the motor 16a feeds contents — such as sand — 10 into the conduit 13a in front of wheel. A heating element such as heat lamp 18a having power source line 19a is mounted by screws 20 onto a side face of the vessel structure 11a, with the side and/or upper walls of the vessel structure having moisture-venting ports (or apertures) 43a for venting moisture vaporized by the heat upon the moisture within the sand in the vessel enclosure. Mounted in an inlet port of the vessel structure 11a is a removable cap 27a. By the vibrator 21a being mounted on the underside of the inclined-wall 11aa the contents such as a solid granular material as sand 10 is shaken from otherwise possibly adhering locals on the upper surface of the inclined wall 11aa, as well as the piled sand of possibly a caked state being fully vibrated into a broken slidable state feedable into the outlet port 12a. The vibrator 21a is powered by power line 22a. The combination 9a is mounted by a preferred substantially rigid resilient typically hard rubber mount 23, having flange 23a mounted on the vessel structure 11a and flange 23b mounted on auto support structure 26a by bolts 24a and 25a respectively and nuts 24b and 25b respectively. It will be noted that the rotary valve 14a receives and by centrifugal action throws a measured quantity of sand per cell of the multi-celled gate valve, and that the conduit 13a is inclined in a downward direction so as to have little or no tendency to deposit within the conduit 13a.

The circuit of FIG. 4 illustrates a typical but preferred electrical circuit for the present invention for a combination sanding device combination feedable of sand to a forward position ahead of a tire (wheel) such as wheel 41. It is not as desirable to have a reverse side of a front wheel sanded normally because normally solely the rear wheel 42 would need a sanded surface in order to pull rearwardly, except in the case of a motorvehicle having four-wheel drive. Accordingly, from the battery 40 power is fed to brake switch 29 which is operatively connected to brake lever (footbrake lever) 30 whereby the switch 29 is closed by stepping on the brake, and manual cut-out switch 33 for cutting-out the brake circuit when sanding is not needed during driving during typically fair weather. But power is also providable to the motor 16a by a manual switch 35 which upon actuation by the closing thereof causes current to flow through the induction relay coil 39 which closes switch 36 while the power current drives the typically one-cycle motor 16a which after one cycle breaks circuit whereby the lack of current in induction coil 39 no longer holds closed the relay switch which thereby opens until a subsequent manual closing of switch 35. The motor 16a becomes actuated solely if the gear-lever (manual or automatic) 32 is in the forward direction in which position contact 37a is closed by switch arm 31a, whereby motor power lead line 17a receives current. Whenever line 17a and ground line 17a' are activated, the light 34 (or other electrical signal means) in series typically in line 17a is activated so that the auto operator may be advised that the motor 16a is operating. The vibrator 21a typically is in parallel with the motor 16a subsequent in series with the switch arm 31a so that the vibrator is actuated solely when the motor 16a is actuatable. The heating lamp 20 is in series with switch arm 28 and terminal 28' from which power line 19a feeds current to the lamp 18a having ground 19a'.

Figure 6:
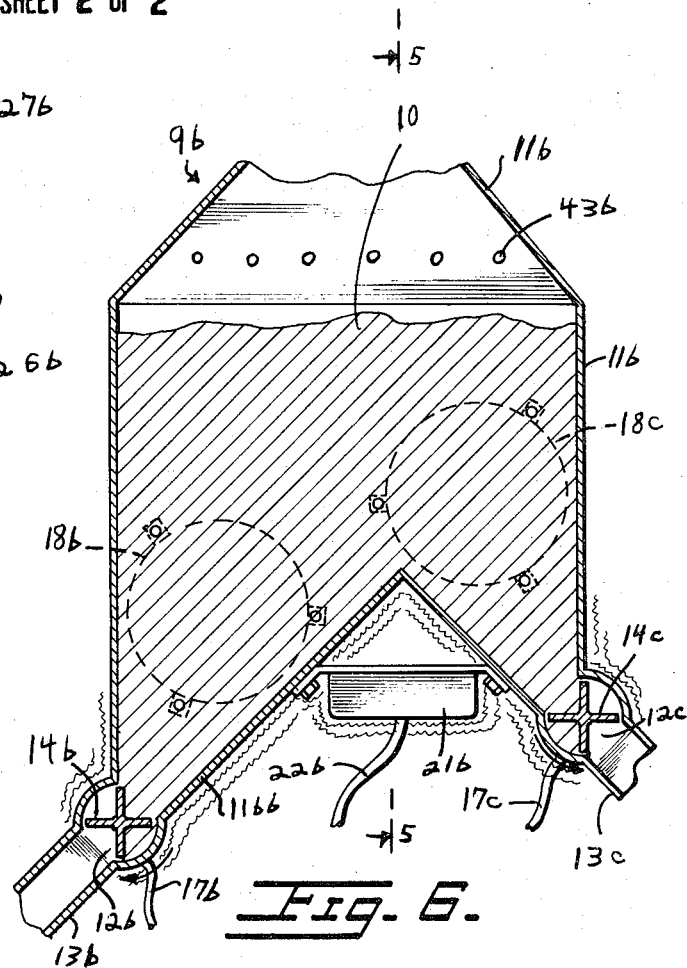
FIG. 6 illustrates an in-part view as taken along lines 6—6 of FIG. 5.
Figure 7:
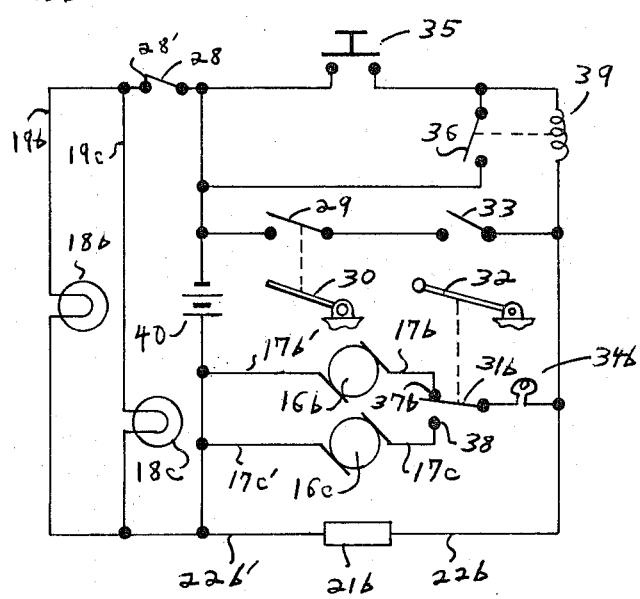
FIG. 7 illustrates a typical preferred electrical circuitry for the rearward device of FIGS. 1 and 5 and 6.

FIGS. 5 through 7 illustrate a basically similar sand 9b as that of 9a, except having fore and aft ports 12b and 12c respectively and corresponding elements servicing those ports or outlets, the corresponding elements of these latter Figures being identically labeled as those of FIGS. 1-4, except for the additional but corresponding elements being labeled as "b" and/or "c" as the case may be for the rear forward port elements and the rear rearward port elements respectively. However, as in the circuitry of FIG. 7, some of the lever(s) and switch(es) of FIG. 4 are the same utilized in the FIG. 7 circuit and in such case(s) is(are) identically numbered.

The sole noteworthy differences include the rearward inclined-wall 11cc is shorter than the forward inclined-wall 11bb since the forward sanding motor and gate valve 14b thereof would obviously be more often utilized than the backing reverse-gear gate valve 14c, and accordingly the greater volume of sand 10 is channelable toward the forward valve 14b.

Similarly, because there are both forward and reverse motors 16b and 16c as illustrated in the FIG. 7 circuit, the switch arm 31b is in series circuit with the indicator light 34b and is switchable from and back to (and between to and fro) terminals 37b and 38 respectively for the activation of motors 16b (forward) and 16c (rearward) respectively as powered by power lines 17b and 17c respectively and their grounds 17b' and 17c' respectively. In the illustrated embodiment there are the forward lamp 18b and rearward lamp 18c respectively powered by power lines 19b and 19c respectively. The heat lamps 18a, b, and c are controlled by a common switch arm 28 and terminal 28' since all should be on simultaneously. Instead of two lamps 18b and 18c, a single larger lamp may be employed typically.

It is to be understood that variations and/or modifications and/or substitution of equivalents may be made within the spirit and scope of this invention, the illustrative Figures being merely of preferred embodiments and illustrative of the inventive mechanism but not unduly limiting the scope of the invention thereto. I claim:

1. A wheeled vehicular anti-ice-skid combination comprising: container vessel structure defining an at-least partial enclosure and having a first lower vessel inner inclined-wall and having aligned with a base of the inclined-wall a first outlet-opening structure positioned for gravity feed therethrough of contents of the vessel structure; first gate means mounted in said outlet-opening structure for controlably alternately feeding through and retaining at said outlet-opening structure contents within said enclosure, said gate means including an openable and closable gate element, and an electrical gate-element actuation device operatively connected to open and close said gate element; switch means for said controlable feeding and retaining, said switch means including an electrical circuit electrically actuatable of said device, and including at least a first switch in and for the circuit openable and closable of said outlet-opening structure, at least a first manually-operated lever operatively connected to said first switch for effecting said feeding by manipulation of said first switch.

2. A wheeled vehicular anti-ice-skid combination of claim 1, including a gear-shift second lever shiftable from neutral to either of forward and reverse gear shifts, in which said circuit includes a second circuit-breakable switch in series in said circuit, said second switch being operatively connected with said second lever in a closed-circuit state when said second lever is shifted to a forward gear shift and in a broken-circuit state when said second lever is shifted to a reverse gear state; further including a vehicle having wheels supportedly mounted thereon; said outlet-opening structure being positioned directable of contents of the vessel structure to a site located in a forward direction of the vehicle relative to at least one of said wheels.

3. A wheeled vehicular anti-ice-skid combination of claim 2, including a second outlet-opening structure spaced from said first outlet-opening structure, for feeding gravity-fed contents, and a second inner inclined-wall having said second outlet-opening structure aligned with a base of the second inclined-wall with the second outlet-opening structure positioned for gravity feed therethrough of contents of the vessel structure, and second gate means mounted in said second outlet-opening structure for controlably alternately feeding through and retaining at said second outlet-opening structure gravity-fed contents of said vessel structure, said second gate means including a second openable and closable electrical gate-element actuatable device, said second outlet-opening structure being positioned directable of contents of the vessel structure to a site located in a rearward direction of the vehicle relative to at least one of said wheels; an additional electrical circuit connected in electrical series with said first switch and including a third circuit-breakable switch in electrical series in said additional circuit and openable and closable of said additional circuit, said third switch being operatively connected between said first switch and said second device in the electrical series of the additional circuit and operatively connected with said second lever in a closed-circuit state when said second lever is shifted to a rear gear shift and in a broken-circuit state when said second lever is shifted to a forward gear shift.

4. A wheeled vehiclular anti-ice-skid combination of claim 2, in which said first device is programmed to run a predetermined number of cycles and to thereafter break circuit until additional subsequent electrical actuation and in which in said first circuit an induction coil is included, and additionally a fourth switch and power circuit therefor connected operatively to and feedable of electric current into said first circuit at a point between said first switch and said induction coil.

5. A wheeled vehicular anti-ice-skid combination of claim 2, including a heating means mounted for maintaining an above-freezing temperature of said structure and contents therein; further including a vibrator means mounted as a part of the combination for facilitating by vibration gravity feed of vessel solid contents along said inclined-wall to said outlet-opening structure; further including resilient mounting structure secured to said vessel structure for the mounting thereof on an automotive vehicular structure; and said first gate means including a rotary gate feedable of a predetermined volume of vessel-structure contents per revolution.

6. A wheeled vehicular anti-ice-skid combination of claim 5, including an operatively connected indication means activated upon activation of said first gate means.

7. A wheeled vehicular anti-ice-skid combination of claim 6, further including a second outlet-opening structure spaced from said first outlet-opening structure, for feeding gravity-fed contents, and a second inner inclined-wall having said second outlet-opening structure aligned with a base of the second inclined-wall with the second outlet-opening structure positioned for gravity feed therethrough of contents of the vessel structure, and second gate means mounted in said second outlet-opening structure for controlably alternately feeding through and retaining at said second outlet-opening structure gravity-fed contents of said vessel structure, said second gate means including a second openable and closable electrical gate-element actuatable device, said second outlet-opening structure being positioned directable of contents of the vessel structure to a site located in a rearward direction of the vehicle relative to at least one of said wheels; an additional electrical circuit connected in electrical series with said first switch and including a third circuit-breakable switch in electrical series in said additional circuit and openable and closable of said additional circuit, said third switch being operatively connected between said first switch and said second device in the electrical series of the additional circuit and operatively connected with said second lever in a closed-circuit state when said second lever is shifted to a rear gear shift and in a broken-circuit state when said second lever is shifted to a forward gear shift, said vibrator means being mounted on at least one of said first and second inclined-walls, and said container vessel structure defining moisture-venting ports.

* * * * *